(12) United States Patent
Sun et al.

(10) Patent No.: US 12,012,139 B2
(45) Date of Patent: Jun. 18, 2024

(54) FOLDING CART WITH HIGH LOAD-BEARING CHASSIS STRUCTURE

(71) Applicant: ZHEJIANG JIANSHENG LEISURE PRODUCTS CO., LTD, Zhejiang (CN)

(72) Inventors: Yuanru Sun, Zhejiang (CN); Jian He, Zhejiang (CN)

(73) Assignee: ZHEJIANG JIANSHENG LEISURE PRODUCTS CO., LTD, Zhejiang (CN)

( * ) Notice: Subject to any disclaimer, the term of this patent is extended or adjusted under 35 U.S.C. 154(b) by 541 days.

(21) Appl. No.: 17/334,825

(22) Filed: May 31, 2021

(65) Prior Publication Data

US 2021/0284216 A1  Sep. 16, 2021

Related U.S. Application Data

(63) Continuation-in-part of application No. 17/137,367, filed on Dec. 30, 2020, which is a continuation-in-part of application No. PCT/CN2020/116444, filed on Sep. 21, 2020.

(30) Foreign Application Priority Data

Oct. 18, 2019 (CN) .......................... 201921755041.6

(51) Int. Cl.
*B62B 3/02* (2006.01)
*B62B 5/06* (2006.01)

(52) U.S. Cl.
CPC ................ *B62B 3/02* (2013.01); *B62B 5/067* (2013.01); *B62B 2205/02* (2013.01); *B62B 2205/06* (2013.01); *B62B 2205/26* (2013.01)

(58) Field of Classification Search
CPC ..... B62B 2205/06; B62B 5/067; B62B 3/007; B62B 3/02; B62B 3/025
See application file for complete search history.

(56) References Cited

U.S. PATENT DOCUMENTS

| | | | | |
|---|---|---|---|---|
| 10,399,586 B1* | 9/2019 | Huang | ...................... | B62B 5/06 |
| 10,633,010 B1* | 4/2020 | Zhang | ...................... | B62B 3/025 |
| 10,953,903 B1* | 3/2021 | Park | ........................ | B62B 3/007 |
| 11,572,091 B1* | 2/2023 | Wang | ........................ | B62B 5/00 |
| 2021/0284216 A1* | 9/2021 | Sun | .......................... | B62B 5/067 |
| 2023/0094718 A1* | 3/2023 | Zhou | ...................... | B62B 3/025 |
| | | | | 280/651 |

* cited by examiner

*Primary Examiner* — Katy M Ebner
(74) *Attorney, Agent, or Firm* — JCIP GLOBAL INC.

(57) ABSTRACT

A folding cart includes a frame body. The frame body includes a chassis, lower hinge seats, a front folding mechanism, a rear folding mechanism, and side-folding mechanisms. The chassis comprises two X-shaped crossed hinge structures, inner ends of left and right sides of the two X-shaped crossed hinge structures are hinged together with a first connector. A middle part of the side-folding mechanism has a second connector. Outer ends of the X-shaped crossed hinge structures are universally hinged with the corresponding lower hinge seats. Each of the X-shaped crossed hinge structure comprises a first bottom rod, a bottom rod connecting seat hinged with a middle part of the first bottom rod, and two second bottom rods respectively hinged with both ends of the bottom rod connecting seat.

10 Claims, 14 Drawing Sheets

FOLDING CART WITH HIGH LOAD-BEARING CHASSIS STRUCTURE

CROSS-REFERENCE TO RELATED APPLICATIONS

This is a continuation-in-part application of U.S. patent application Ser. No. 17/137,367, filed on Dec. 30, 2020, now pending. The prior U.S. patent application Ser. No. 17/137,367 is a continuation-in-part application of International Patent Application No. PCT/CN2020/116444, filed on Sep. 21, 2020, which claims the priority benefit of Chinese Patent Application No. 201921755041.6 filed on Oct. 18, 2019. The entirety of each of the above-mentioned patent applications is hereby incorporated by reference herein and made a part of this specification.

BACKGROUND

Technical Field

The present invention belongs to the field of cart, and in particular relates to a folding cart with a high load-bearing chassis structure.

Description of Related Art

The cart is a vehicle capable of loading a certain amount of articles, and is widely used in shopping, traveling, outdoor recreation, etc. The existing carts are generally fix-typed, which cannot be folded, and are not convenient to use.

SUMMARY

To overcome the shortcomings of the prior art, the present invention provides a technical scheme of a folding cart with a high load-bearing chassis structure.

The folding cart with a high load-bearing chassis structure comprises a frame body, the frame body comprises a chassis, four lower hinge seats at four corners of the chassis, four lower hinge seats, a front folding mechanism at the front of the chassis, a rear folding mechanism at the back of the chassis and two side-folding mechanisms on both sides of the chassis. The side-folding mechanism comprises at least one X-shaped crossed hinge rod group, upper ends of both sides of the side-folding mechanisms are respectively hinged with the upper hinge seats, lower ends of both sides of the side-folding mechanisms are respectively hinged with the corresponding lower hinge seats. The front folding mechanism comprises at least one X-shaped crossed hinge rod group, upper ends of both sides of the X-shaped crossed hinge rod group are respectively hinged with the corresponding upper hinge seats, lower ends of both sides of the X-shaped crossed hinge rod group are respectively hinged with the corresponding lower hinge seats. The rear folding mechanism comprises at least one X-shaped crossed hinge rod group, upper ends of both sides of the X-shaped crossed hinge rod group are respectively hinged with the corresponding upper hinge seats, and lower ends of both sides of the X-shaped crossed hinge rod group are respectively hinged with the corresponding lower hinge seats. The chassis comprises two X-shaped crossed hinge structures, inner ends of the left side and inner ends of the right side of the X-shaped crossed hinge structure are hinged together with a first connector, a middle part of the side-folding mechanism has a second connector, outer ends of the X-shaped crossed hinge structure are universally hinged with the corresponding lower hinge seats. When the folding cart is transformed from the unfolded state to the folded state, the X-shaped crossed hinge structure may tilt and swing relative to the lower hinge seats, so as to promote the two X-shaped crossed hinge structures to transform from an original horizontal state to a collapse state, the first connector and the second connector are transformed from an original buckled state to an unbuckled state. The X-shaped crossed hinge structure comprises a first bottom rod, a bottom rod connecting seat hinged with the middle part of the first bottom rod, and two second bottom rods respectively hinged with both ends of the bottom rod connecting seat.

Preferably, the bottom rod connecting seat is a Z-shaped structure, such that two second bottom rod bodies are arranged in a staggered manner.

Preferably, the bottom rod connecting seat comprises two connecting plates, the middle part of the first bottom rod and the end portion of each of the second bottom rod bodies are clamped between two connecting plates.

Preferably, the first connector is first spherical hinge structure, the second connector has a first receiving groove for engaging with the spherical head of the first spherical hinge structure.

Preferably, a second spherical hinge structure is provided at the outer ends of each of the X-shaped crossed hinge structures, a second receiving groove for universally engaging with a spherical head of the second spherical hinge structure is provided in each of the lower hinge seats.

Preferably, wheels are provided on the bottom portion of the lower hinge seats, a supporting rod is provided on each of the lower hinge seats, and a reinforcing rod is hinged between the supporting rod and the adjacent X-shaped crossed hinge rod group.

Preferably, the folding cart further comprises a handle mechanism, the handle mechanism comprises a handle rod, a handle hinge seat provided on the handle rods, and pulling rods hinged on both sides of the handle hinge seat, two pulling rods are hinged with two lower hinge seats in front of the chassis, respectively, the handle rod may drive the handle hinge seat to move upward.

The folding cart, wherein the handle rod is slidably inserted into the handle hinge seat, and a lower end of the handle rod is provided with a handle rod stopper, so that when the handle rod is pulled upward, the handle rod stopper may drive the handle hinge seat to move upward.

The folding cart, wherein the handle rod is provided with an insertion pin in limiting fit with the handle hinge seat, a first spring for providing pressure for the insertion pin, and a control mechanism for pulling the insertion pin.

The folding cart, wherein the control mechanism comprises a pull rope for pulling the insertion pin, a pull pin connected with the pull rope and a second spring sleeved on the pull pin and abuts against an end portion of the pull pin for limiting the pull pin and supporting the pull pin to move back to its original place.

Compared with the prior art, the present invention has a reasonable design and a simple structure, it may be folded and stored when it is not in use, so it occupies small space and is convenient to use; further, the connecting structure, comprising the first bottom rod, the bottom rod connecting seat and second bottom rod body, is used for the X-shaped crossed hinge structure of the chassis of the present invention, the bottom rod connecting seat has a simple structure, and it may be directly made of metal materials, without any plastic part to connect the rods, such that the chassis has excellent load-bearing performance.

DESCRIPTION OF THE EMBODIMENTS

Figure 1:
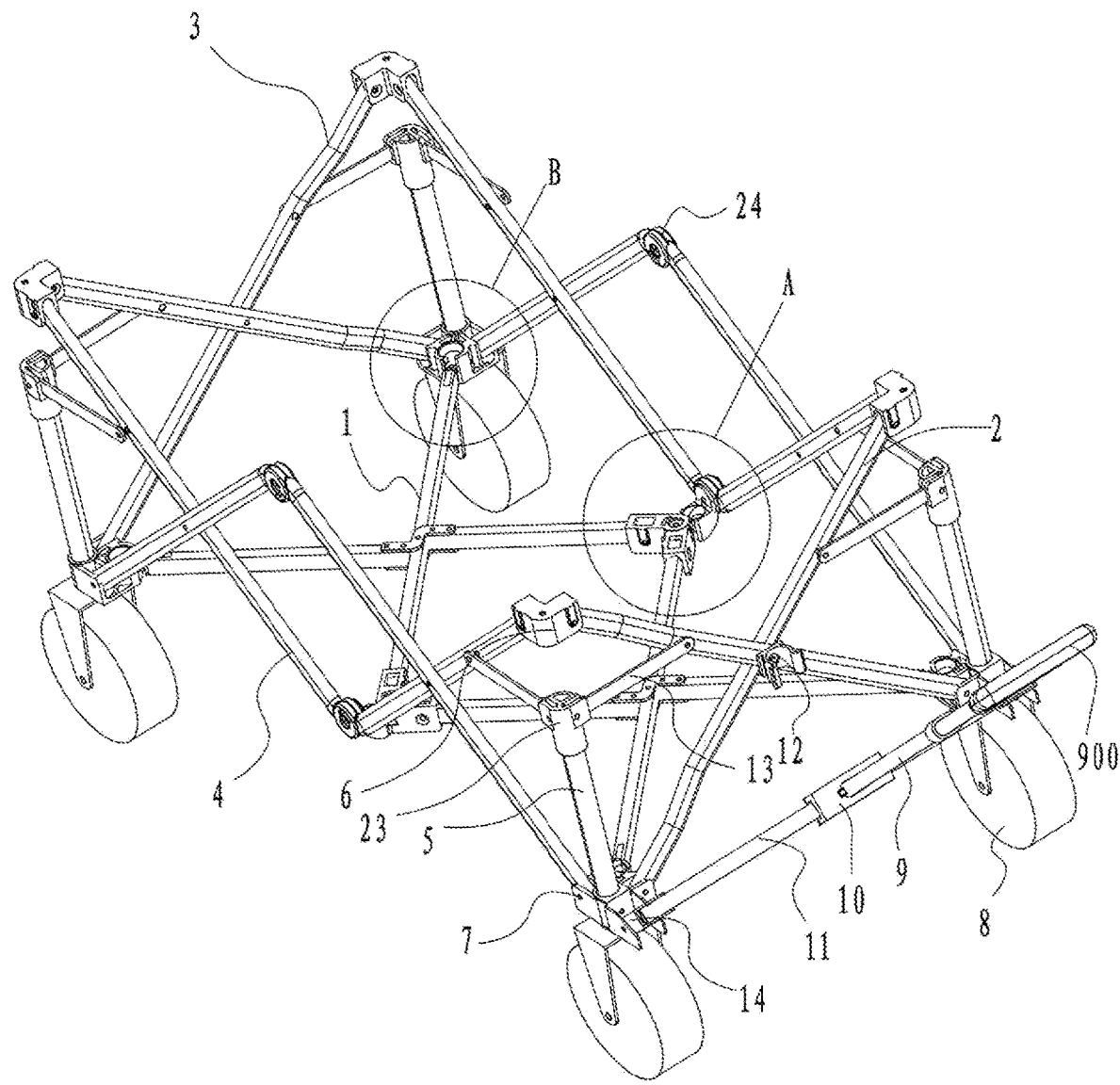
FIG. 1 is a structure diagram of the present invention in fully unfolded state.
Figure 2:
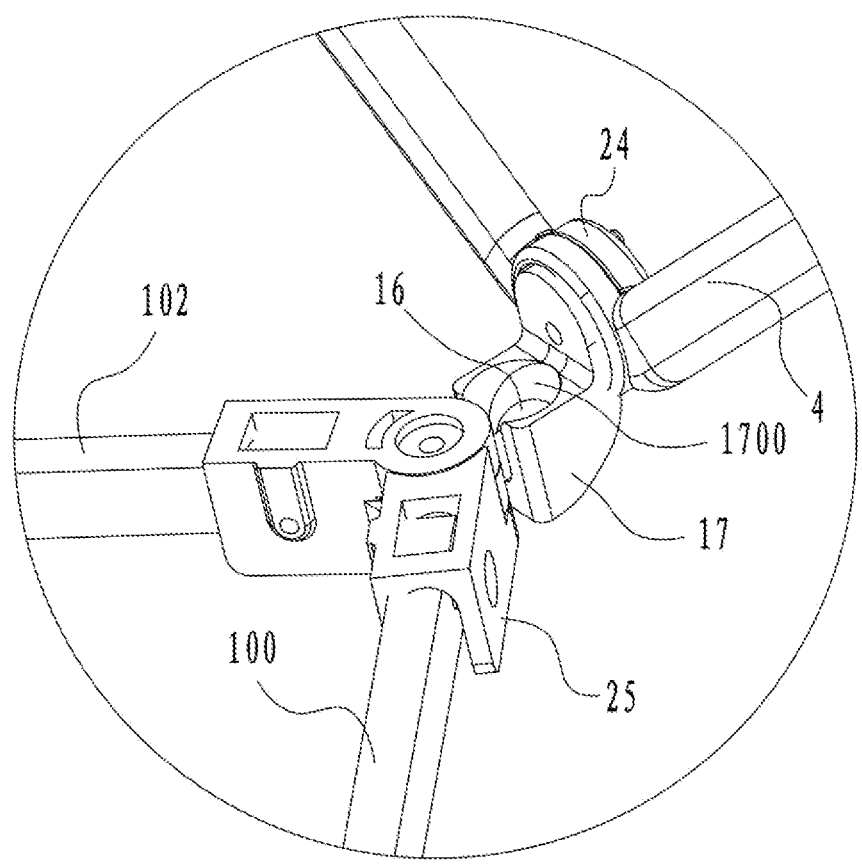
FIG. 2 is an enlarged view of part A in FIG. 1.
Figure 3:
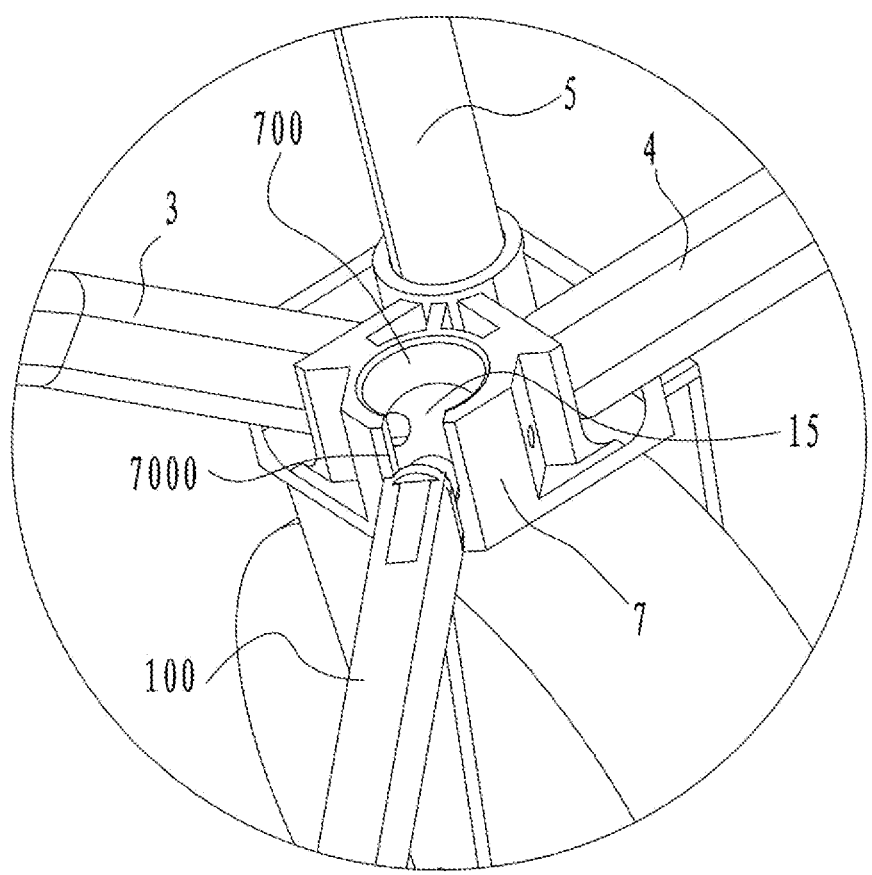
FIG. 3 is an enlarged view of part B in FIG. 1.
Figure 4:
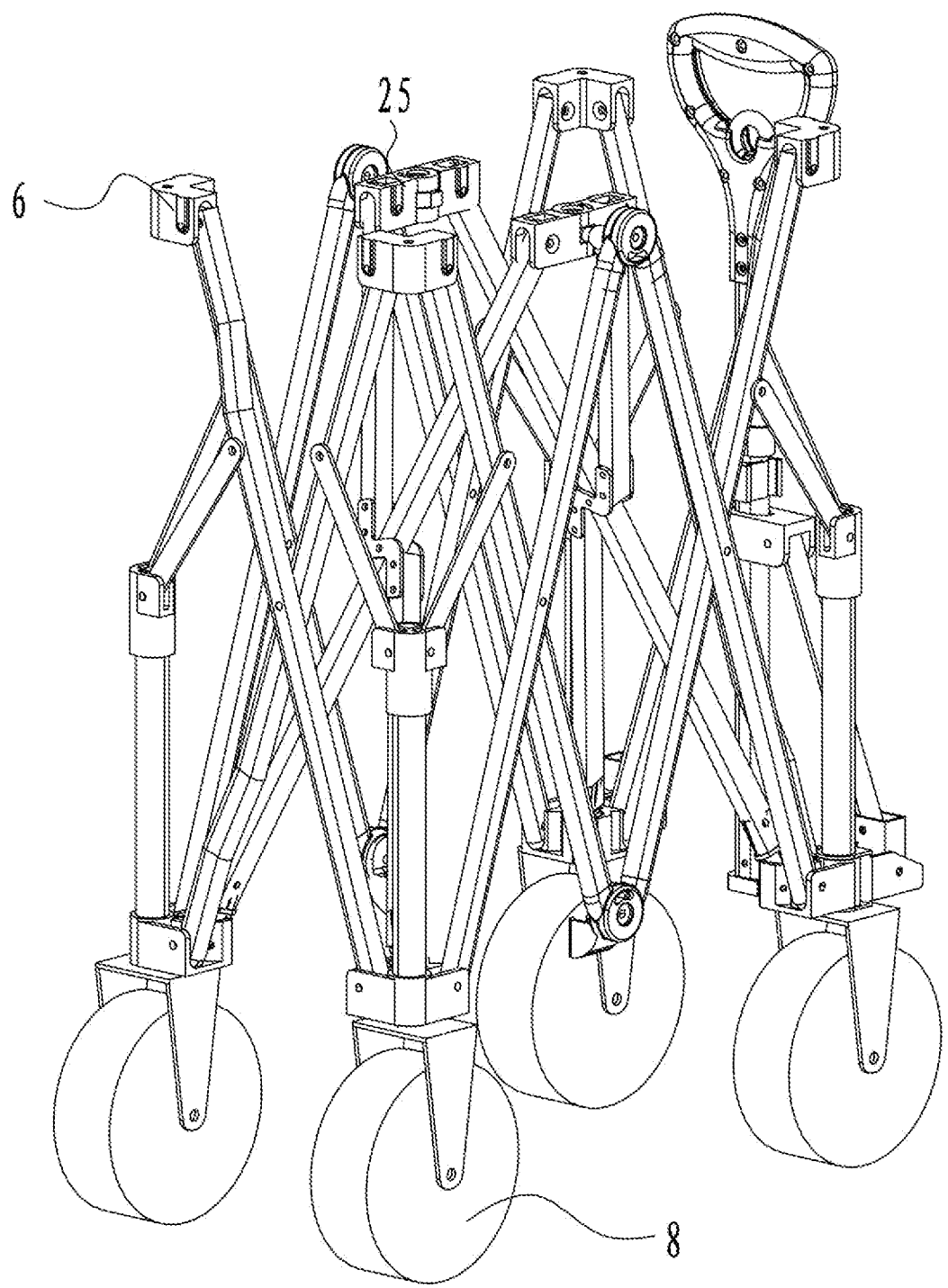
FIG. 4 is a structure diagram of the present invention in half-unfolded state.
Figure 5:
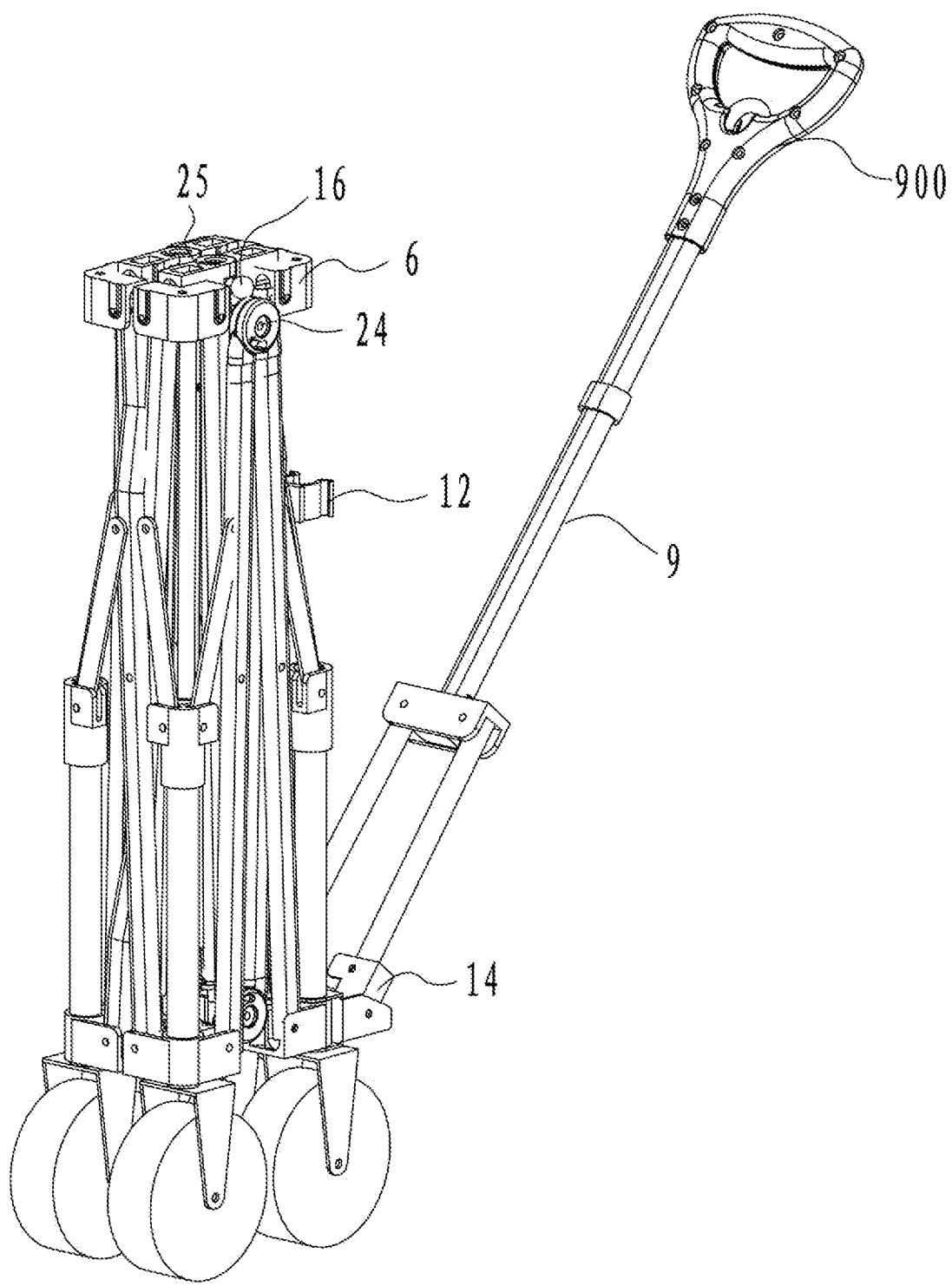
FIG. 5 is structure diagram 1 of the present invention in folded state.
Figure 6:
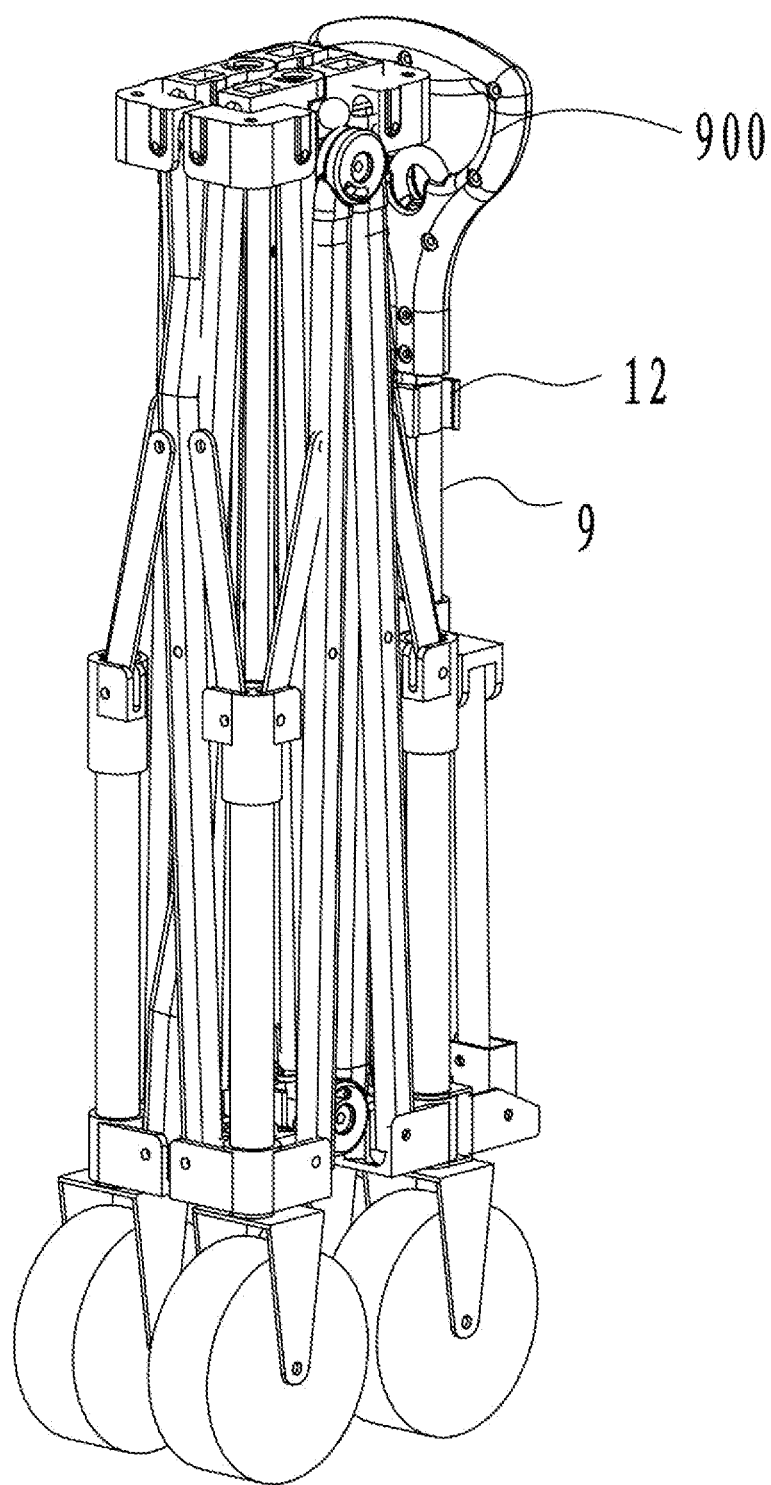
FIG. 6 is structure diagram 2 of the present invention in the folded state.
Figure 7:
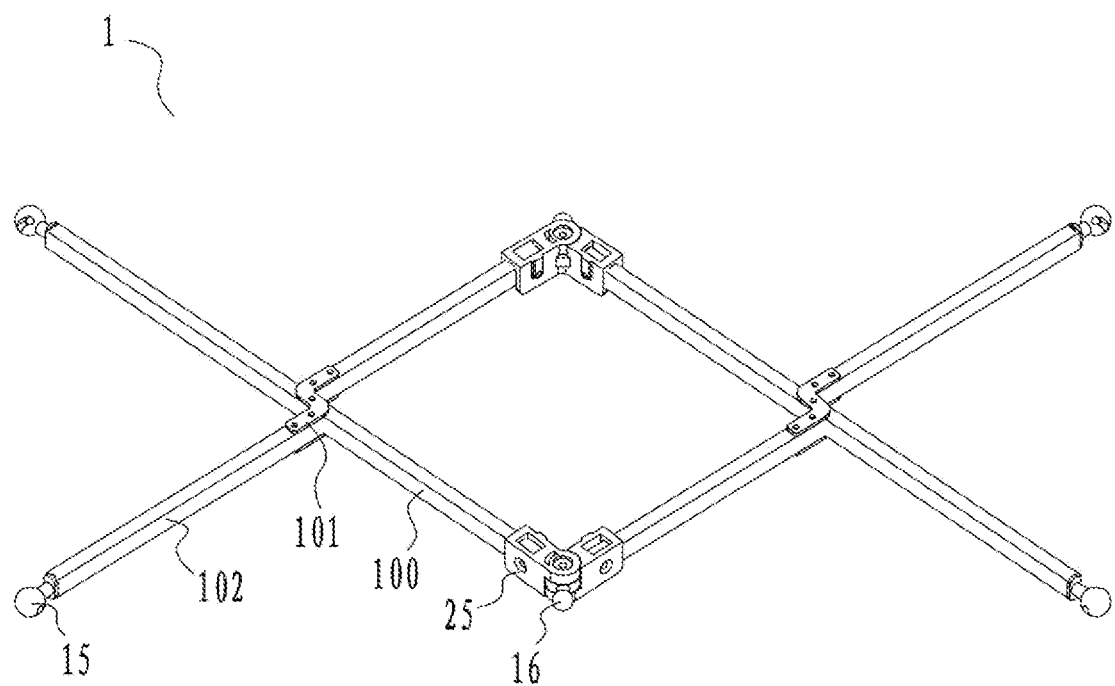
FIG. 7 is structure diagram of the chassis of the present invention in horizontal state.
Figure 8:
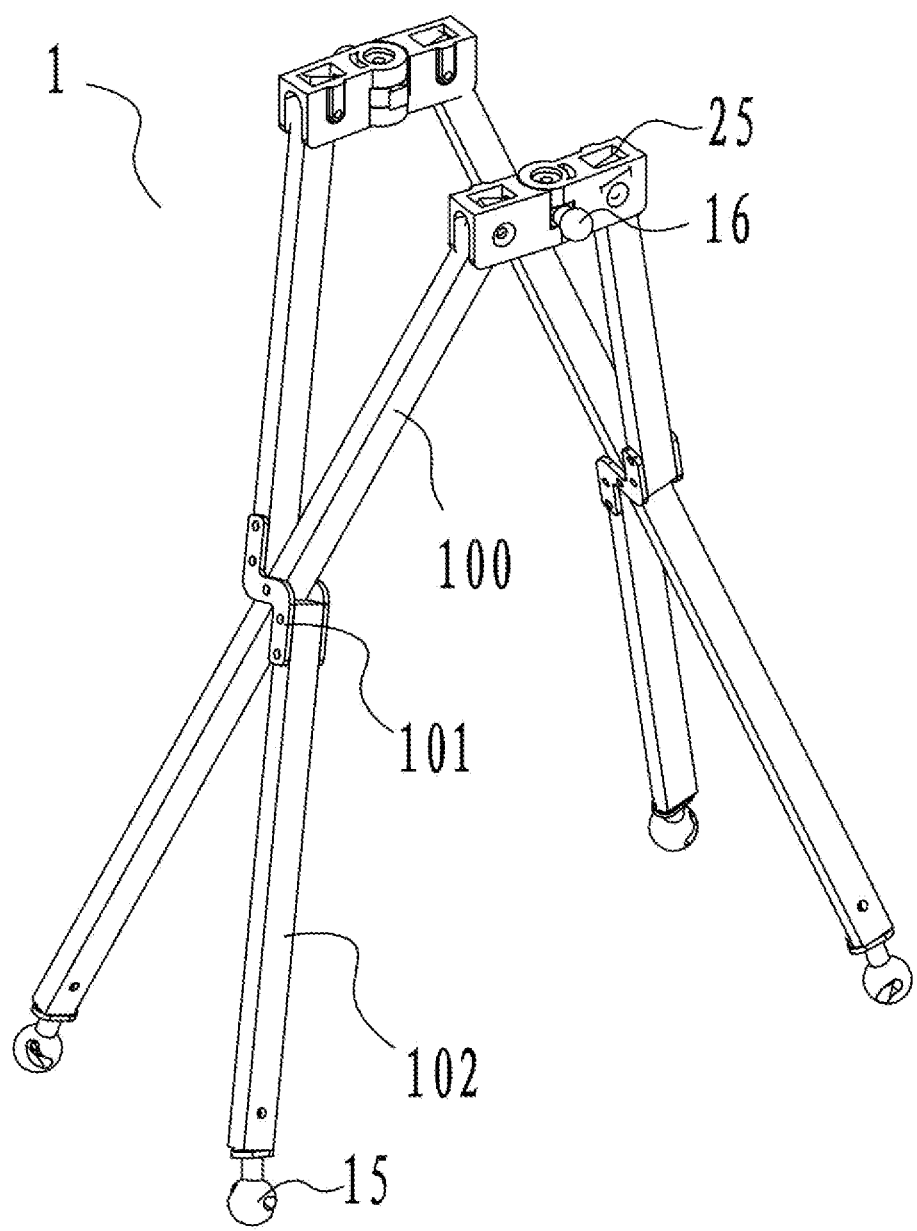
FIG. 8 is structure diagram of the chassis of the present invention being tilted.
Figure 9:
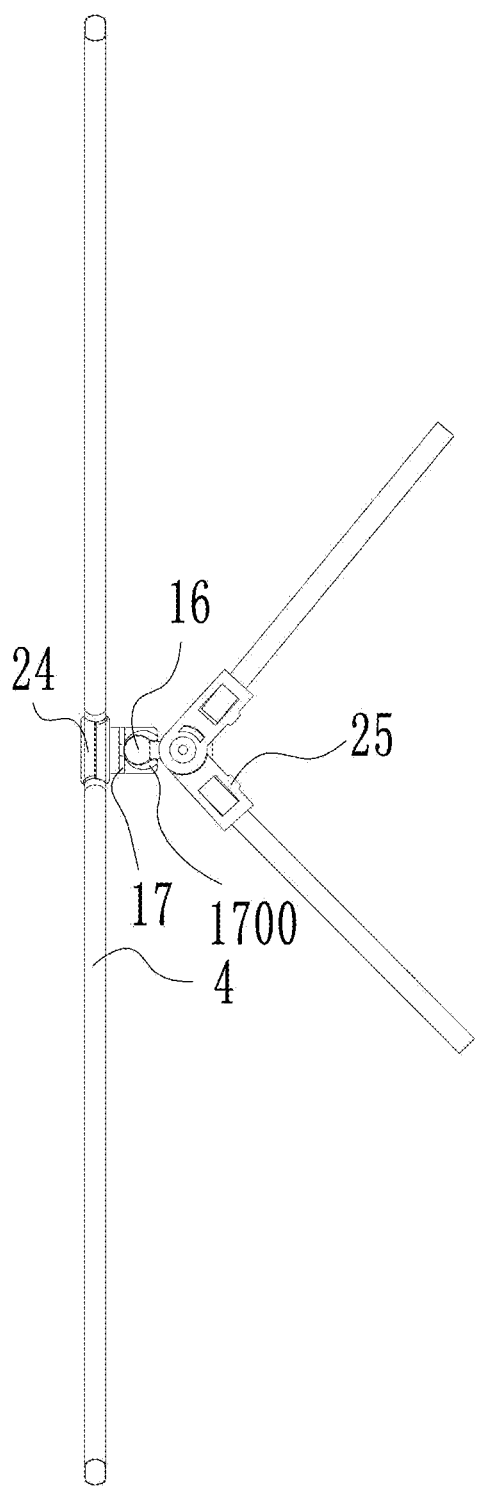
FIG. 9 is a structure diagram of the connecting between the side-folding mechanism and the bottom rod of the present invention.
Figure 10:
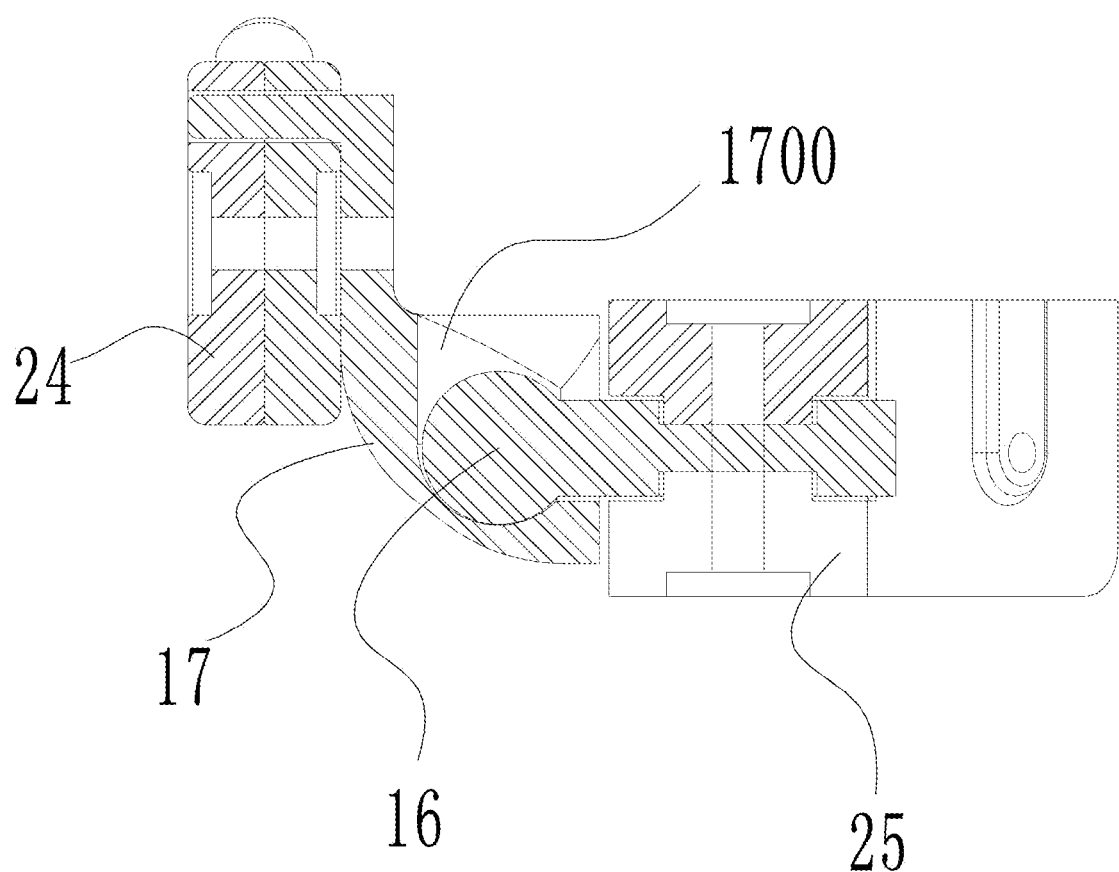
FIG. 10 is a sectional structure diagram of the connecting between the first connector and the second connector of the present invention.
Figure 11:
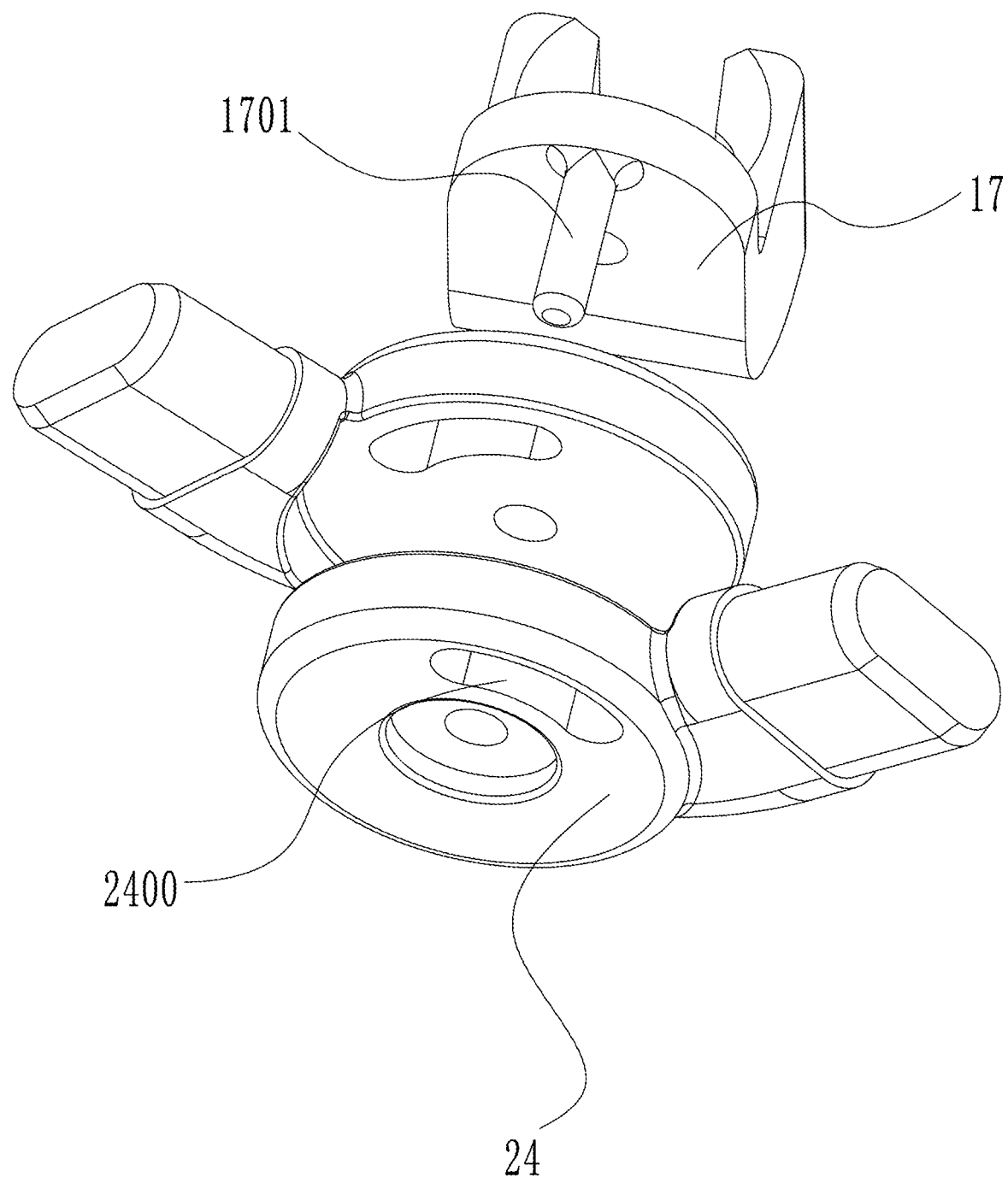
FIG. 11 is a structure diagram of the connecting between the hinge seat of the side-folding mechanism and the second connector of the present invention.
Figure 12:
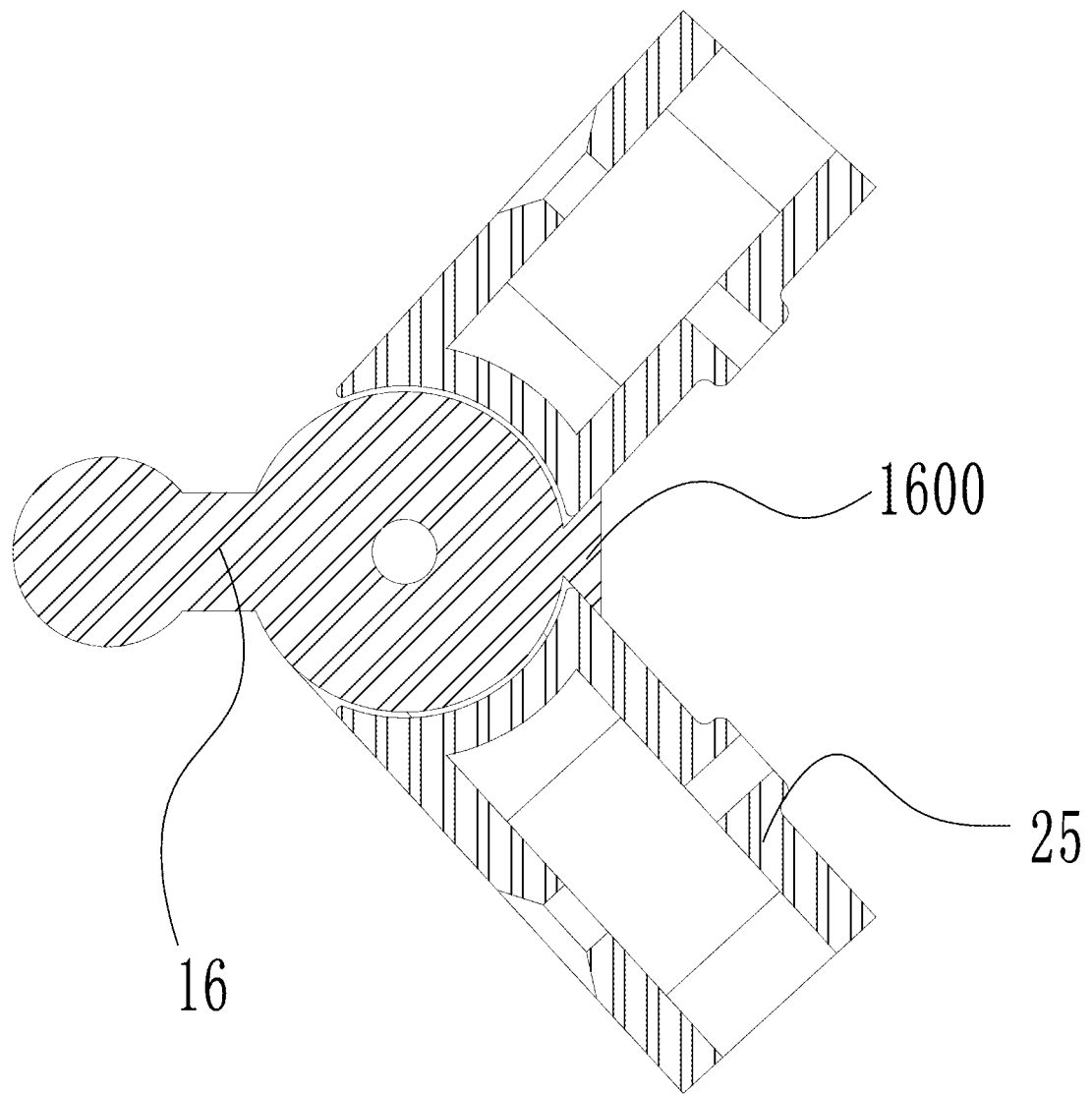
FIG. 12 is a sectional structure diagram of the connecting between the first connector and the bottom rod hinge joint.
Figure 13:
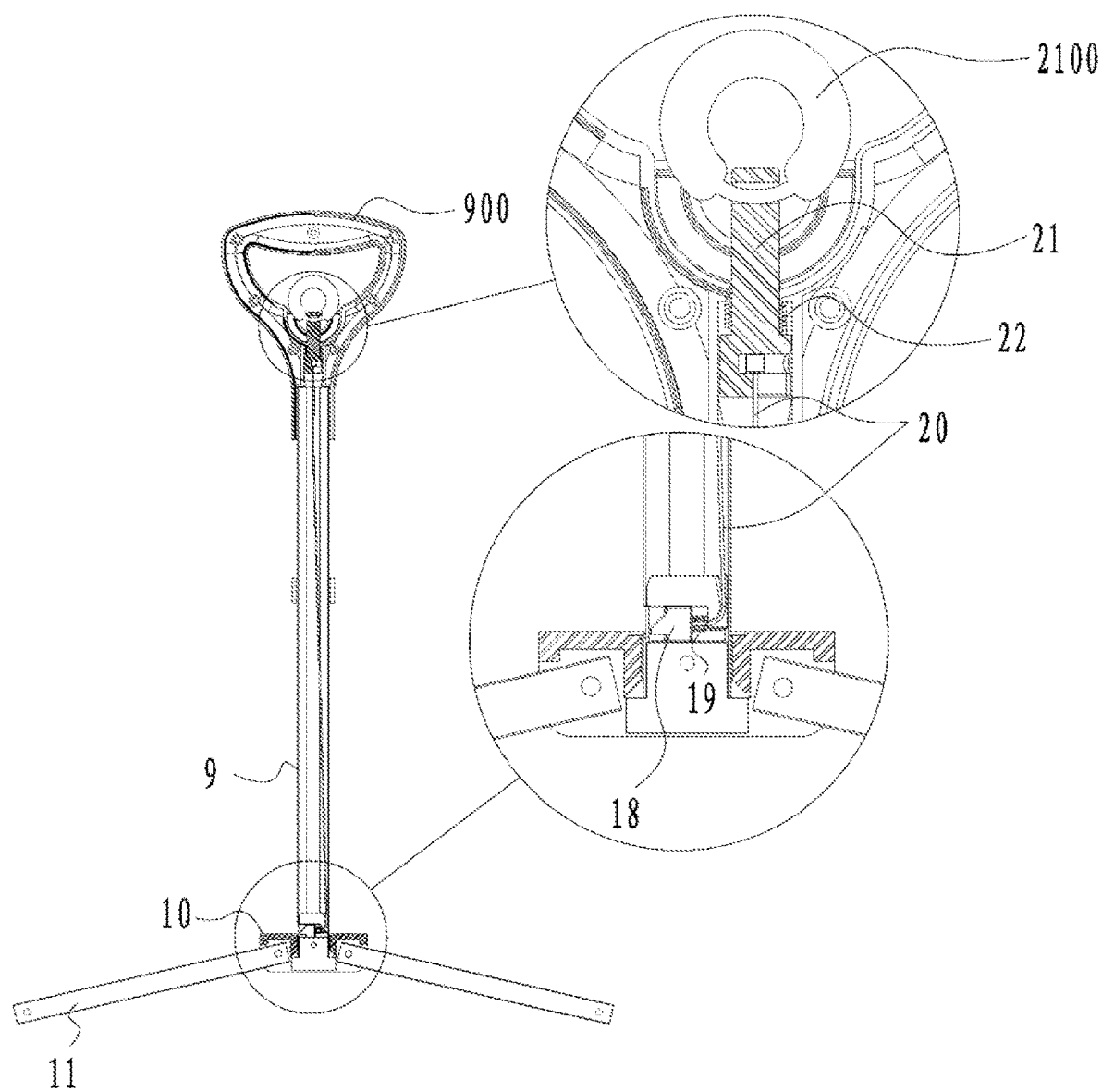
FIG. 13 is an inner structure diagram of the handle of the present invention.
Figure 14:
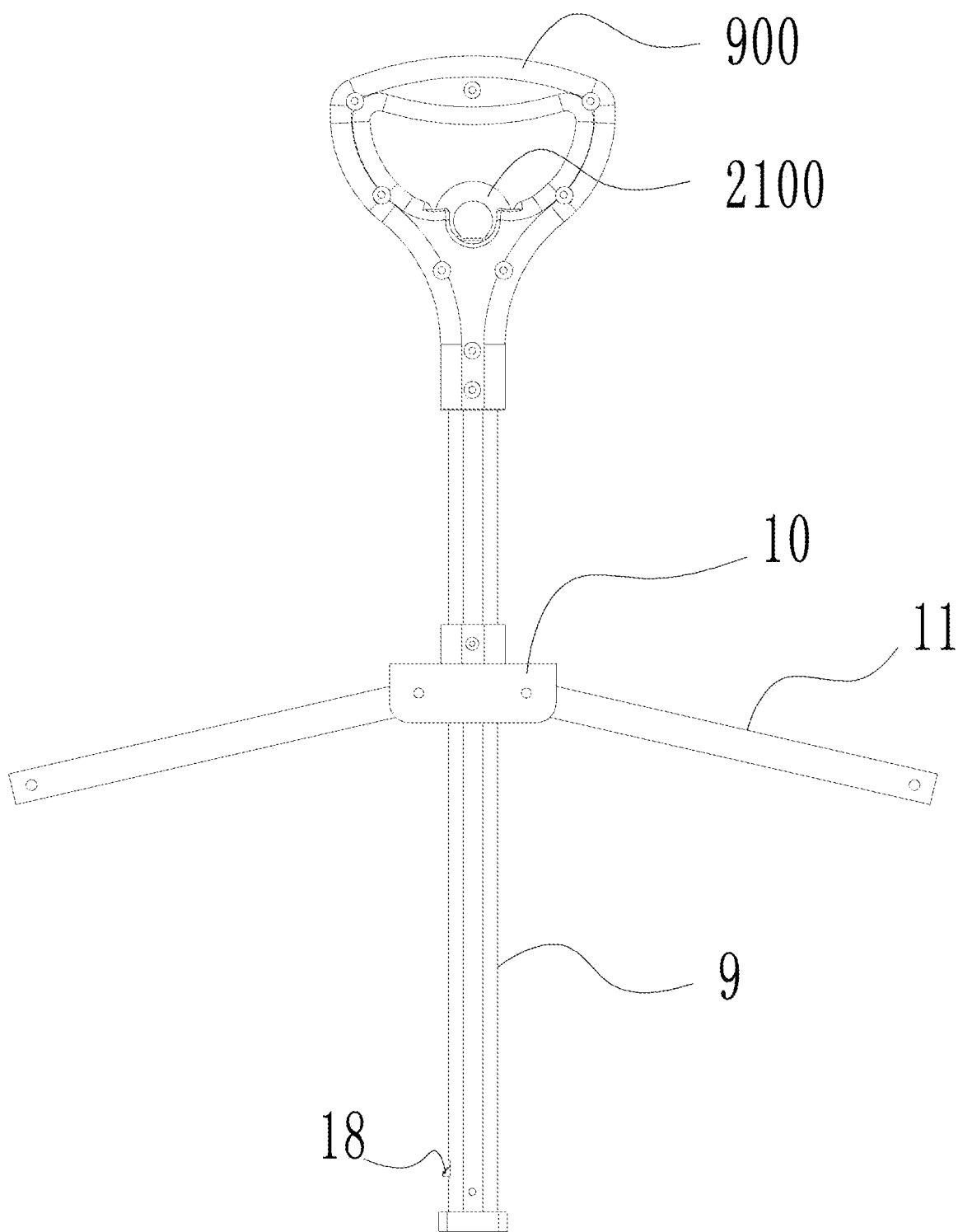
FIG. 14 is an outer structure diagram of the handle of the present invention.

The present invention will be further elaborated hereafter in connection with the drawings.

As shown in the drawings, a folding cart comprises a frame body and a handle mechanism. The frame body comprises a chassis 1, lower hinge seats 7 at four corners of the chassis, four upper hinge seats 6 disposed above the lower hinge seats 7, a front folding mechanism 2 at the front of the chassis 1, a rear folding mechanism 3 at the back of the chassis 1 and two side-folding mechanisms 4 respectively on both sides of the chassis 1. Wheels 8 are provided at a bottom portion of the lower hinged seats 7.

Each of the side-folding mechanism 4 comprises two X-shaped crossed hinge rod groups, and each of the two X-shaped crossed hinge rod groups comprises two hinged crossed rods. Upper ends of both sides of each of the side-folding mechanisms 4 are respectively hinged with the corresponding upper hinge seats 6, and lower ends of both sides of each of the side-folding mechanisms 4 are respectively hinged with the corresponding lower hinge seat 7.

The front folding mechanism 2 comprises an X-shaped crossed hinge rod group. The X-shaped crossed hinge rod group comprises two hinged crossed rods, the upper ends of these two crossed rods are respectively hinged with two upper hinge seats 6 in front of the chassis 1, the lower ends of these two crossed rods are respectively hinged with two lower hinge seats 7 in front of the chassis 1, the hinge site of these two crossed rods is provided with a handle rod holder 12.

The rear folding mechanism 3 comprises an X-shaped crossed hinge rod group. The X-shaped crossed hinge rod group comprises two hinged crossed rods, the upper ends of these two crossed rods are respectively hinged with two upper hinge seats 6 at the back of the chassis 1, the lower ends of these two crossed rods are respectively hinged with two lower hinge seats 7 at the back of the chassis 1. The structure of the rear folding mechanism 3 is almost the same as that of front folding mechanism 2.

The chassis 1 comprises two X-shaped crossed hinge structures, the inner ends of the left side and the inner ends of the right side of these two X-shaped crossed hinge structure are respectively hinged together with a first connector 16. A middle part of the side-folding mechanism 4 has a second connector 17. Two outer ends of the X-shaped crossed hinge structure are each universally hinged with the corresponding lower hinge seat 7. When the folding cart is transformed from an unfolded state to a folded state, the X-shaped crossed hinge structures may tilt and swing relative to the lower hinge seats 7, so as to promote the two X-shaped crossed hinge structures to transform from an original horizontal state to a collapsed state, and the first connector 16 and the second connector 17 are transformed from an original buckled state to the unbuckled state. The X-shaped crossed hinge structure comprises a first bottom rod 100 and a second bottom rod assembly, the second bottom rod assembly comprises a bottom rod connecting seat 101 hinged with a middle part of the first bottom rod 100 and two second bottom rod bodies 102 respectively provided at both ends of the bottom rod connecting seat 101.

As an optimization, the bottom rod connecting seat 101 is a Z-shaped structure, such that two second bottom rod bodies 102 are arranged in a staggered manner. The bottom rod connecting seat 101 comprises two connecting plates, the middle part of the first bottom rod 100 and the end portion of each of the second bottom rod bodies 102 are clamped between two connecting plates. Specifically, two second bottom rod bodies 102 are connected through a upper connecting plate and a lower connecting plate, and there is a certain distance between two second bottom rod bodies 102, so that a gap is formed between two connecting plates, consequently, the middle part of the first bottom rod 100 may be arranged to pass through the gap.

As an optimization, the first connector 16 is first spherical hinge structure, the second connector 17 has a first receiving groove for engaging with the spherical head of the first spherical hinge structure 1700. In addition, this structure may be modified as follows. The second connector 17 is configured as the first spherical hinge structure, and the first connector 16 has a first receiving groove 1700. The first spherical hinge structure may be designed into various shapes, such as square, cylinder and the like, it is not limited to a shape of sphere, and the shape of the first receiving groove 1700 corresponds to the structure. The first connector 16 is a hinge of the inner end of the corresponding first bottom rod 100 together with the inner end of the second bottom rod assembly.

In the above structure, the outer end of the first bottom rod 100 and outer end of the second bottom rod assembly are both provided with a second spherical hinge structure 15, a second receiving groove 700 for universally engaging with the spherical head of the second spherical hinge structure 15 is provided on the lower hinge seat 7, the second receiving groove 700 has an opening 7000 for tilting and swinging of the second spherical hinge structure 15 following the bottom rod 103. In addition, this structure may be modified as follows. The lower hinge seat 7 is provided with a second spherical hinge structure 15, while the corresponding bottom rod is provided with a second receiving groove 700.

A further description of the first connector 16 is described as follows. The inner end of the first bottom rod 100 and the inner end of the second bottom rod assembly are hinged together with the first connector 16 by the bottom rod hinge joint 25 in a way of pin-shaft hinging. Wherein, the first connector 16 has a limiting block 1600 on its end away from the spherical head, the limiting block 1600 is a ladder structure. When two bottom rod hinge joints 25 are rotated to the minimum angle, these two bottom rod hinge joints 25 abut against both sides of the limiting block 1600, so as to keep the first connector 16 stable, unrotatable, and easy for fitting.

A further description of the side-folding mechanism 4 is described as follows. Two corresponding crossed rods in the side-folding mechanism 4 are hinged together with the second connector 17 through their own hinge seat 24 of the side-folding mechanism, respectively, in a way of hinge-shaft hinging. Wherein, the second connector 17 has a rotating pin 1701, there are arc-shaped grooves 2400 on the hinge seat joints 24 of both side-folding mechanisms. These two arc-shaped grooves 2400 are symmetrical on both of the left side and the right side. The rotating pin 1701 is inserted into these two arc-shaped grooves 2400 at the same time. When the hinge seat 24 of these two side-folding mechanisms is rotated to the maximum angle left-wise or right-wise, the rotating pin 1701 is just limited in the middle, so as to keep the second connecting seat 17 stable, unrotatable, and easy for fitting.

As an optimization, supporting rods 5 are provided on the lower hinge seats 7, a reinforcing rod 13 is hinged between the supporting rod 5 and the adjacent X-shaped crossed hinge rod group. Specifically, a reinforcing rod installation seat 23 is coordinately installed on the upper end of the supporting rod 5, and the supporting rod 5 is hinged with the reinforcing rod 13 through the reinforcing rod installation seat 23.

As an optimization, the handle mechanism comprises a handle rod 9, a handle hinge seat 10 provided on the handle rods 9, and pulling rods 11 hinged on both sides of the handle hinge seat 10, two pulling rods 11 are hinged with two lower hinge seats 7 in front of the chassis 1, respectively. The handle rod 9 may drive the handle hinge seat 10 to move upward. Specifically, the handle rod 9 may be a telescopic structure, lower ends of the pulling rods 11 are hinged to pulling rod hinge seats 14, and the pulling rod hinge seats 14 are hinged to the corresponding lower hinge seats 7. The handle rod 9 may be clamped to the handle rod holder 12. The handle rod holder 12 is plastic piece with a clamping mount which fits the shape of the handle rod 9. Wherein, the handle rod 9 is provided with an insertion pin 18 in limiting fit with the handle hinge seat 10, a first spring 19 for providing pressure for the insertion pin 18, and a control mechanism for pulling the insertion pin 18.

Further, the control mechanism comprises a pull rope 20 for pulling the insertion pin 18, a pull pin 21 connected with the pull rope 20 and a second spring 22 sleeved on the pull pin 21 and abuts against an end portion of the pull pin 21 for limiting the pull pin 21, such that the second spring 22 can support the pull pin 21 to move back to its original place.

Still further, a ring handle 900 is disposed on upper end of the handle rod 9. The pull pin 21 is inserted into the upper end of the handle rod 9, the pull pin 21 has a pull ring 2100, and the pull ring 2100 locates in the ring handle 900.

When in use, the handle rod 9 is removed from the handle rod holder 12, and then the handle rod 9 is pulled up for the handle rod 9 to drive the handle hinge seat 10 to move upward and for the handle hinge seat 10 to drive two lower hinge seats 9 connected therewith to move away from each other, then further to fully open the entire frame body, followed by putting a layer of cloth for the load on the cart as needed.

When the folding cart of the present invention is folded, the front folding mechanism 2, the rear folding mechanism 3, the side-folding mechanisms 4 and the chassis 1 are all folded. The two X-shaped crossed hinge structures of the chassis 1 are gradually rotated and folded, and finally transformed into a collapsed state. The bottom rod hinge joint 25 drives the first connector 16 to move upward and separates from the second connector 17. The bottom rod hinge joint 25 and the upper hinge seat 6 finally gather together, so that the volume of the cart decreases largely. Then the pull pin 21 is pulled, the pull pin 21 drives the insertion pin 18 to separate from the opening of the handle rod 9 through the pull rope 20. The insertion pin 18 is no longer block-connected with the handle hinge seat 10, so that the handle rod 9 may be pressed down, and the whole handle mechanism is shortened, finally, the handle rod 9 is engaged with the handle rod holder 12.

At last, it should be stated that the above various embodiments are only used to illustrate the technical solutions of the present invention without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present invention.

What is claimed is:

1. A folding cart with a high load-bearing chassis structure, comprising a frame body, the frame body comprises: a chassis, four lower hinge seats at four corners of the chassis, a front folding mechanism at a front of the chassis, a rear folding mechanism at a back of the chassis and two side-folding mechanisms on both sides of the chassis, wherein each of the side-folding mechanisms comprises at least one X-shaped crossed hinge rod group, upper ends of both sides of each of the side-folding mechanisms are respectively hinged with two corresponding upper hinge seats, lower ends of both sides of each of the side-folding mechanisms are respectively hinged with two corresponding lower hinge seats;

the front folding mechanism comprises at least one X-shaped crossed hinge rod group, upper ends of both sides of the X-shaped crossed hinge rod group of the front folding mechanism are respectively hinged with two corresponding upper hinge seats, lower ends of both sides of the X-shaped crossed hinge rod group of the front folding mechanism are respectively hinged with two corresponding lower hinge seats;

the rear folding mechanism comprises at least one X-shaped crossed hinge rod group, upper ends of both sides of the X-shaped crossed hinge rod group of the rear folding mechanism are respectively hinged with two corresponding upper hinge seats, and lower ends of both sides of the X-shaped crossed hinge rod group of the rear folding mechanism are respectively hinged with two corresponding lower hinge seat;

the chassis comprises two X-shaped crossed hinge structures, inner ends of a left side and inner ends of a right side of the X-shaped crossed hinge structures are respectively hinged together with a first connector, a middle part of each of the side-folding mechanisms has a second connector, outer ends of each of the X-shaped crossed hinge structures are respectively and universally hinged with two corresponding lower hinge seats, when the folding cart is transformed from an unfolded state to a folded state, the X-shaped crossed hinge structures are able to tilt and swing relative to the lower hinge seats, so as to promote the two X-shaped crossed hinge structures to transform from a horizontal state to a collapsed state, the first connectors and the second connectors are transformed from a buckled state to an unbuckled state;

each of the X-shaped crossed hinge structures comprises a first bottom rod and a second bottom rod assembly, the second bottom rod assembly comprises a bottom rod connecting seat hinged with a middle part of the first bottom rod and two second bottom rod bodies respectively provided at both ends of the bottom rod connecting seat.

2. The folding cart with a high load-bearing chassis structure according to claim 1, wherein the bottom rod connecting seat is a Z-shaped structure, such that two second bottom rod bodies are arranged in a staggered manner.

3. The folding cart according to claim 1, wherein the bottom rod connecting seat comprises two connecting plates, the middle part of the first bottom rod and an end portion of each of the second bottom rod bodies are clamped between the two connecting plates.

4. The folding cart according to claim 1, wherein each of the first connectors is a first spherical hinge structure, each of the second connectors has a first receiving groove for engaging with a spherical head of the first spherical hinge structure.

5. The folding cart according to claim 1, wherein a second spherical hinge structure is provided at the outer ends of each of the X-shaped crossed hinge structures, a second receiving groove for universally engaging with a spherical head of the second spherical hinge structure is provided in each of the lower hinge seats.

6. The folding cart with a high load-bearing chassis structure according to claim 1, wherein a wheel is provided on a bottom portion of each of the lower hinge seats; a supporting rod is provided on each of the lower hinge seats, a reinforcing rod is hinged between the supporting rod and the adjacent X-shaped crossed hinge rod group.

7. The folding cart with a high load-bearing chassis structure according to claim 1, further comprising a handle mechanism, the handle mechanism comprises a handle rod, a handle hinge seat provided on the handle rod, and pulling rods hinged on both sides of the handle hinge seat, the two pulling rods are respectively hinged with the two lower hinge seats in front of the chassis, the handle rod is configured to drive the handle hinge seat to move upward.

8. The folding cart according to claim 7, wherein the handle rod is slidably inserted into the handle hinge seat, a lower end of the handle rod is provided with a handle rod stopper, and when the handle rod is pulled upward, the handle rod stopper may drive the handle hinge seat to move upward.

9. The folding cart according to claim 8, wherein the handle rod is provided with an insertion pin in limiting fit with the handle hinge seat, a first spring for providing pressure for the insertion pin, and a control mechanism for pulling the pin.

10. The folding cart according to claim 9, wherein the control mechanism comprises a pull rope for pulling the insertion pin, a pull pin connected with the pull rope and a second spring sleeved on the pull pin and abuts against an end portion of the pull pin for limiting the pull pin.

* * * * *